US008574118B2

(12) United States Patent
McCune

(10) Patent No.: US 8,574,118 B2
(45) Date of Patent: Nov. 5, 2013

(54) JOURNAL PIN FOR GEAR SYSTEM

(75) Inventor: Michael E. McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/118,741

(22) Filed: May 31, 2011

(65) Prior Publication Data

US 2012/0309582 A1 Dec. 6, 2012

(51) Int. Cl.
*F16H 57/08* (2006.01)
*F16C 33/66* (2006.01)

(52) U.S. Cl.
USPC ............ 475/331; 475/346; 475/347; 384/517

(58) Field of Classification Search
USPC ........................... 475/331, 346, 347; 384/517
See application file for complete search history.

(56) References Cited

U.S. PATENT DOCUMENTS

| | | | | |
|---|---|---|---|---|
| 3,604,770 | A * | 9/1971 | Peltier et al. | 384/286 |
| 3,881,791 | A | 5/1975 | Hentschel | |
| 4,262,975 | A | 4/1981 | Heshmat et al. | |
| 4,765,759 | A | 8/1988 | Le Breton et al. | |
| 5,102,379 | A | 4/1992 | Pagluica et al. | |
| 6,223,616 | B1 * | 5/2001 | Sheridan | 74/468 |
| 6,398,400 | B1 * | 6/2002 | Nienhaus | 384/255 |
| 6,964,155 | B2 | 11/2005 | McCune et al. | |
| 7,591,754 | B2 | 9/2009 | Duong et al. | |
| 7,836,601 | B2 | 11/2010 | El-Shafei | |
| 7,861,805 | B2 | 1/2011 | Dick et al. | |
| 2006/0078239 | A1 * | 4/2006 | Dimofte | 384/100 |
| 2009/0298640 | A1 | 12/2009 | Duong et al. | |
| 2010/0105516 | A1 | 4/2010 | Sheridan et al. | |
| 2010/0331139 | A1 | 12/2010 | McCune | |
| 2010/0331140 | A1 | 12/2010 | McCune | |
| 2011/0249927 | A1 * | 10/2011 | Tepic | 384/517 |

* cited by examiner

*Primary Examiner* — Tisha Lewis
(74) *Attorney, Agent, or Firm* — Carlson, Gaskey & Olds, P.C.

(57) ABSTRACT

A turbomachine epicyclic gear system includes a sun gear rotatable around an axis, a ring gear radially outward of the sun gear, and a plurality of intermediate gears meshed with the sun gear and the ring gear. A plurality of journal pins are each configured to support one of the plurality of intermediate gears. Each of the plurality of journal pins has an asymmetric rim.

18 Claims, 6 Drawing Sheets

30
A
74
66
106
96
70
72
62
64
82
122
128
124
48
88
86
P
68
76
78
60
123
87
131
126
80

122
100

128
144a
148a
126
146
149
150
136
142
134
132
127
140
150
148b
144b
146
120
80
122
P

202

204 SUPPORTING A FIRST INTERMEDIATE GEAR WITH A JOURNAL PIN HAVING AN ASYMMETRIC RIM.

206 ORIENTING THE JOURNAL PIN SO THAT A MAXIMUM THICKNESS OF THE RIM IS CIRCUMFERENTIALLY ALIGNED WITH A NORMAL LOAD APPLIED TO THE FIRST INTERMEDIATE GEAR.

JOURNAL PIN FOR GEAR SYSTEM

BACKGROUND

This disclosure relates to a gear system and, in particular, to journal pins in an epicyclic gear system.

Turbomachines, such as gas turbine engines, typically include a fan section, a turbine section, a compressor section, and a combustor section. Turbomachines may employ an epicyclic gear system connecting the fan section and the turbine section. Journal pins hold planet (or star) gears between the sun gear and a ring gear. The journal pins connect the planet gears to a gear carrier.

Gas turbine engines are used to propel aircraft. Aircraft maneuvers can undesirably vibrate the epicyclic gear system. Also, high gravity turns or hard landing operations can flex the gas turbine engine case. The flexing transmits a moment load to the journal pin. The moment load can shock the teeth of the gears within the epicyclic gear system, which can cause edge touchdown or failure of the bearing.

SUMMARY

An example turbomachine epicyclic gear system includes a sun gear rotatable around an axis, a ring gear radially outward of the sun gear, and a plurality of intermediate gears meshed with the sun gear and the ring gear. A plurality of journal pins are each configured to support one of the plurality of intermediate gears. Each of the plurality of journal pins has an asymmetric rim.

An example method of installing an epicyclic gear system in a turbomachine includes supporting a first intermediate gear with a journal pin having an asymmetric rim. The journal pin is oriented so that a maximum thickness of the rim is circumferentially aligned with a normal load applied to the first intermediate gear.

An example turbomachine includes an epicyclic gear system driven by a turbine of a turbomachine. The gear system has a rotatable sun gear, a rotatable ring gear radially outward of the sun gear, and at least one intermediate gear meshed with the sun gear and the ring gear. Each intermediate gear is supported by a journal pin. Each journal pin includes an asymmetric rim having a non-uniform thickness at an axial end.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
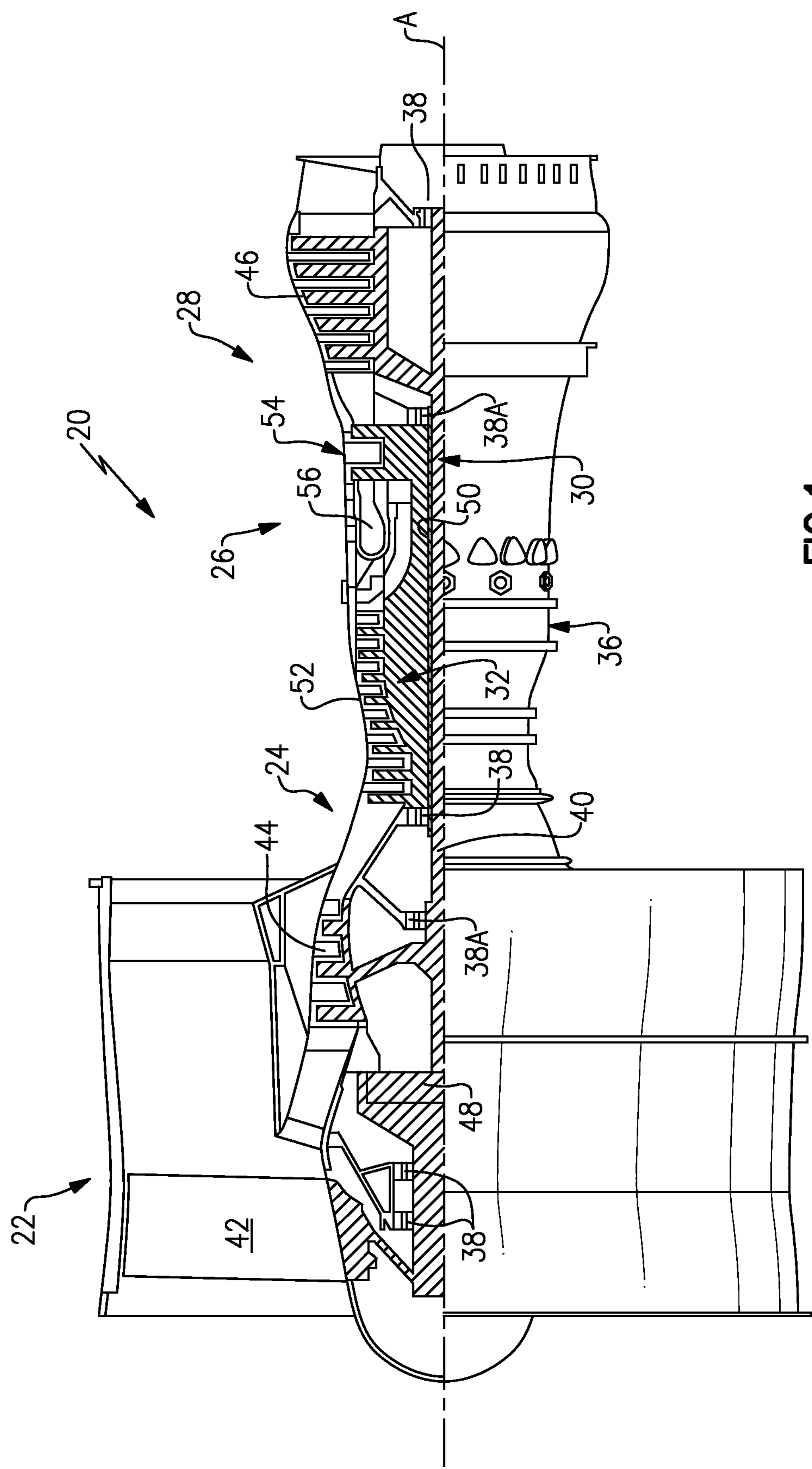
FIG. 1 is a schematic cross-section of a turbomachine.

FIG. 1 schematically illustrates a gas turbine engine 20, which is an example turbomachine. The gas turbine engine 20 is a two-spool turbofan having a fan section 22, a compressor section 24, a combustor section 26, and a turbine section 28. The fan section 22 drives air along a bypass flowpath. The compressor section 24 drives air along a core flowpath for compression. Compressed air is communicated into the combustor section 26 then expanded in the turbine section 28. The engine 20 generally includes a low speed spool 30 and a high speed spool 32 mounted for rotation about longitudinal axis A.

The low speed spool 30 generally includes an inner shaft 40 that rotatably couples a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that rotatably couples a high pressure compressor 52 and high pressure turbine 54. A combustor 56 is arranged between the high pressure compressor 52 and the high pressure turbine 54. The inner shaft 40 and the outer shaft 50 are coaxial and rotate about axis A.

The core airflow is compressed by the low pressure compressor 44 and the high pressure compressor 52. The compressed air is mixed with fuel in the combustor 56 and then expanded over the turbines 46, 54. The turbines 46, 54 rotationally drive the respective low speed spool 30 and high speed spool 32 in response to the expansion. Although shown as a gas turbine engine in this example, it should be understood that the concepts described herein are not limited to use with gas turbine engines as the teachings may be applied to other types of turbomachines and other devices that include geared architectures.

Figure 2:
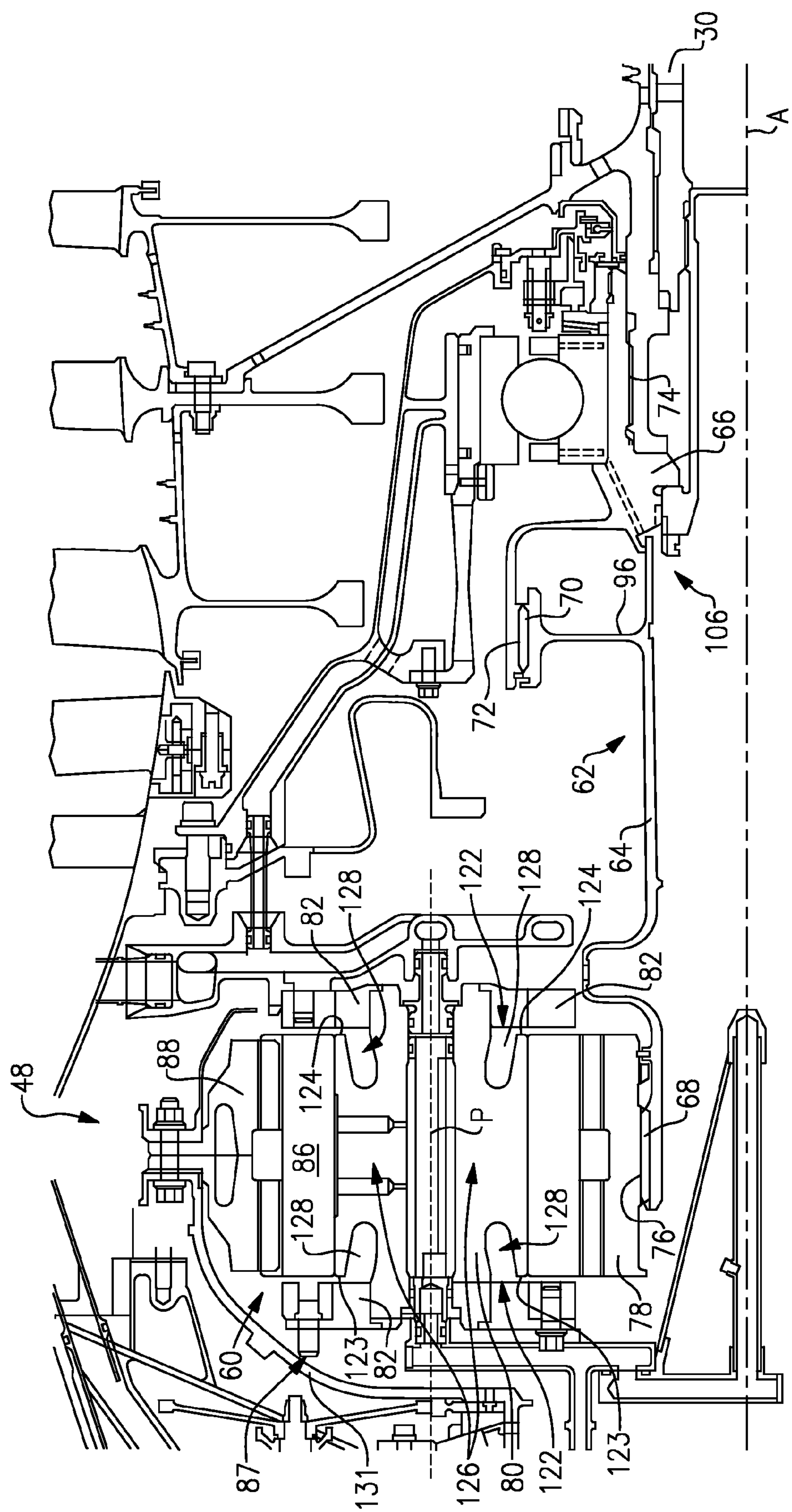
FIG. 2 is a close-up view of an epicyclic gear system within the FIG. 1 turbomachine.

With reference to FIG. 2, the example geared architecture 48 generally includes a coupling shaft assembly 62 that transfers torque from the low speed spool 30 to the geared architecture 48 and segregates vibrations and other transients. The example coupling shaft assembly 62 generally includes a forward coupling shaft section 64 and an aft coupling shaft section 66. The forward coupling shaft section 64 includes an interface spline 68 and a mid shaft interface spline 70. The aft coupling shaft section 66 includes a mid shaft interface spline 72 and an interface spline 74. The large inner diameter of the coupling shaft assembly 62 facilitates receipt of fasteners and tools to secure componentry.

The example geared architecture 48 also includes an epicyclic gear system 60 driven by the low speed spool 30 through the coupling shaft assembly 62. The interface spline 68 is joined, by a gear spline 76, to a sun gear 78 of the epicyclic gear system 60. The sun gear 78 is in meshed engagement with multiple intermediate gears, of which the illustrated star gear 86 is representative. Other examples may include other gears, such as planetary gears.

Each star gear 86 is rotatably mounted in a carrier 82 by a journal pin 80. Rotary motion of the sun gear 78 urges each star gear 86 to rotate about a respective longitudinal axis P. Journal pin 80 is held in place by nut 87 to allow attachment of each star gear 86 to the carrier 82. Each journal pin 80 has a pair of axial faces 123, 124 and a central portion 126 extending an axial length along axis A. The example central portion 126 extends past axial faces 123, 124. However, a central portion 126 of different axial lengths may be used. The journal pin 80 also includes a cavity 128 at either axial end 122.

Each star gear 86 is also in meshed engagement with rotating ring gear 88, which is mechanically connected to a shaft 131. The star gears 86 mesh with both the rotating ring gear 88 and the rotating sun gear 78. The star gears 86 rotate about their respective axis P to drive the ring gear 88 to rotate about engine axis A. The rotation of the ring gear 88 is conveyed to the fan 42 (FIG. 1) through the fan shaft 131 to drive the fan 42 at a lower speed than the low speed spool 30.

Figure 3:
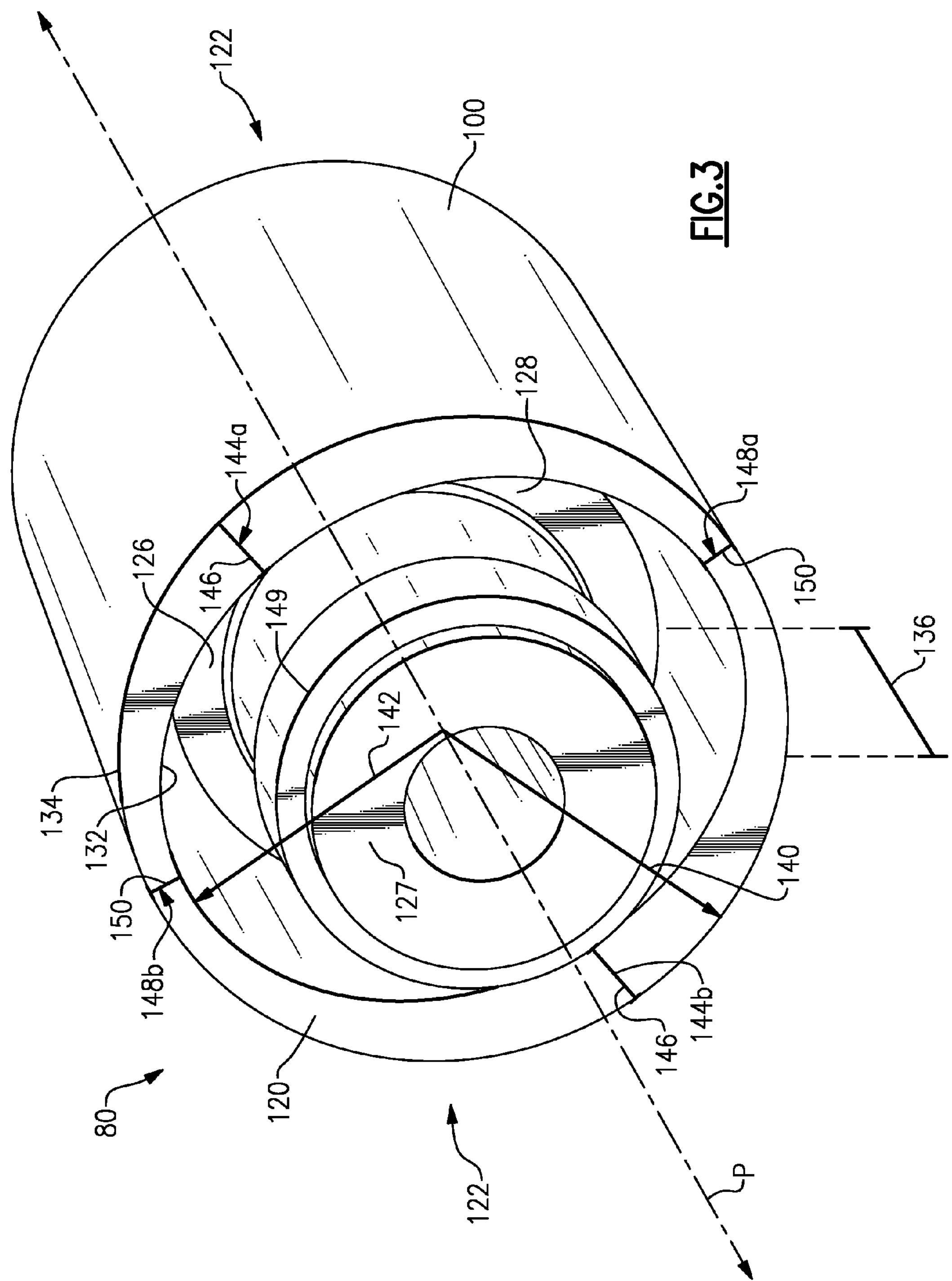
FIG. 3 is a perspective view of an example journal pin within the FIG. 2 epicyclic gear system.
Figure 4:
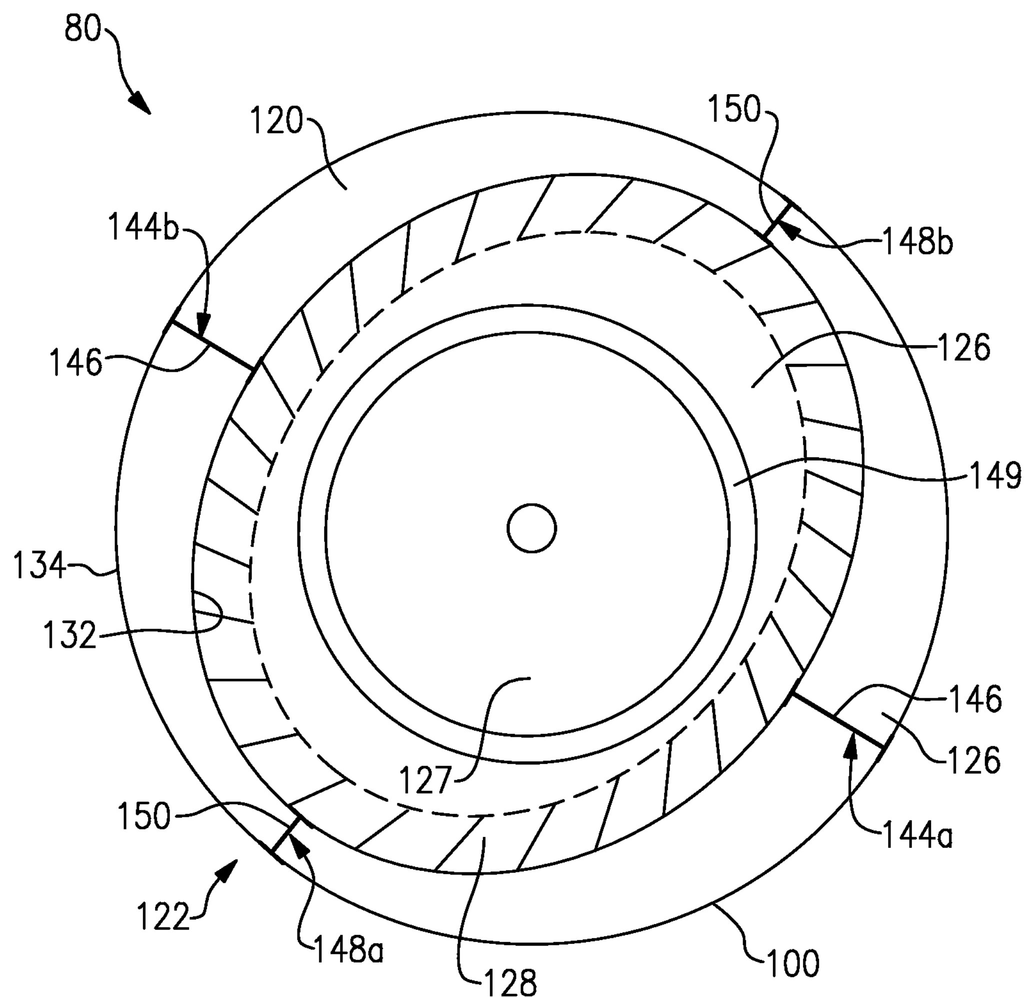
FIG. 4 is an end view of the journal pin of FIG. 3.

Referring now to FIGS. 3 and 4, with continuing reference to FIG. 2, the example journal pin 80 includes an outer circumference 100. Each axial end 122 of the journal pin 80 includes a rim 120 defined between an outer wall 134 and an inner wall 132 on either axial end 122. Each cavity 128 extends axially into the journal pin 80 in an axial direction a length 136. The inner wall 132 is tapered. The example journal pin 80 includes a central portion 126 extending an axial length along axis P. The central portion 126 includes a cylindrical extension 127 which extends axially into the cavity 128. A collar 149 is disposed radially around the cylindrical extension 127.

The example rim 120 has an asymmetric radial thickness. In this example, an outer radius 140 is defined between axis P and the outer wall 134, and an inner radius 142 is defined between the inner wall 132 and axis P. The rim 120 is asymmetric in this example because the outer radius 140 is constant and the inner radius 142 varies.

The example rim 120 includes maximum positions 144*a*, 144*b* where the rim 120 has a maximum thickness defined by length 146. The example rim 120 has minimum positions 148*a*, 148*b* where the rim 120 has a minimum thickness defined by length 150. Beginning at either maximum position 144*a* or 144*b*, and moving in a clockwise direction, the radial thickness of the rim 120 will decrease until it reaches minimum positions 148*a*, 148*b*, respectively. After reaching either of the minimum positions 148*a* or 148*b* and continuing in a clockwise direction, the thickness of the rim 120 will increase until reaching the next maximum position 144*b* or 144*a*. That is, the radial thickness of the rim 120 decreases when moving away from the maximum positions 144*a*, 144*b* toward the minimum positions 148*a*, 148*b* and increases when moving away from a minimum positions 148*a*, 148*b* toward a maximum position 144*a*, 144*b*.

In one example, each of the maximum positions 144*a*, 144*b* is 90° offset from both minimum positions 148*a*, 148*b*. Also, the maximum positions 144*a*, 144*b* are 180° offset from each other, and the minimum positions 148*a*, 148*b* are 180° offset from each other. Although evenly circumferentially distributed in this example, other orientations and locations of maximum positions 144*a*, 144*b* and minimum positions 148*a*, 148*b* may be used.

In one example, length 146 is between 8% and 20% of radius 140 and length 150 is between 4% and 10% of radius 140.

Figure 5:
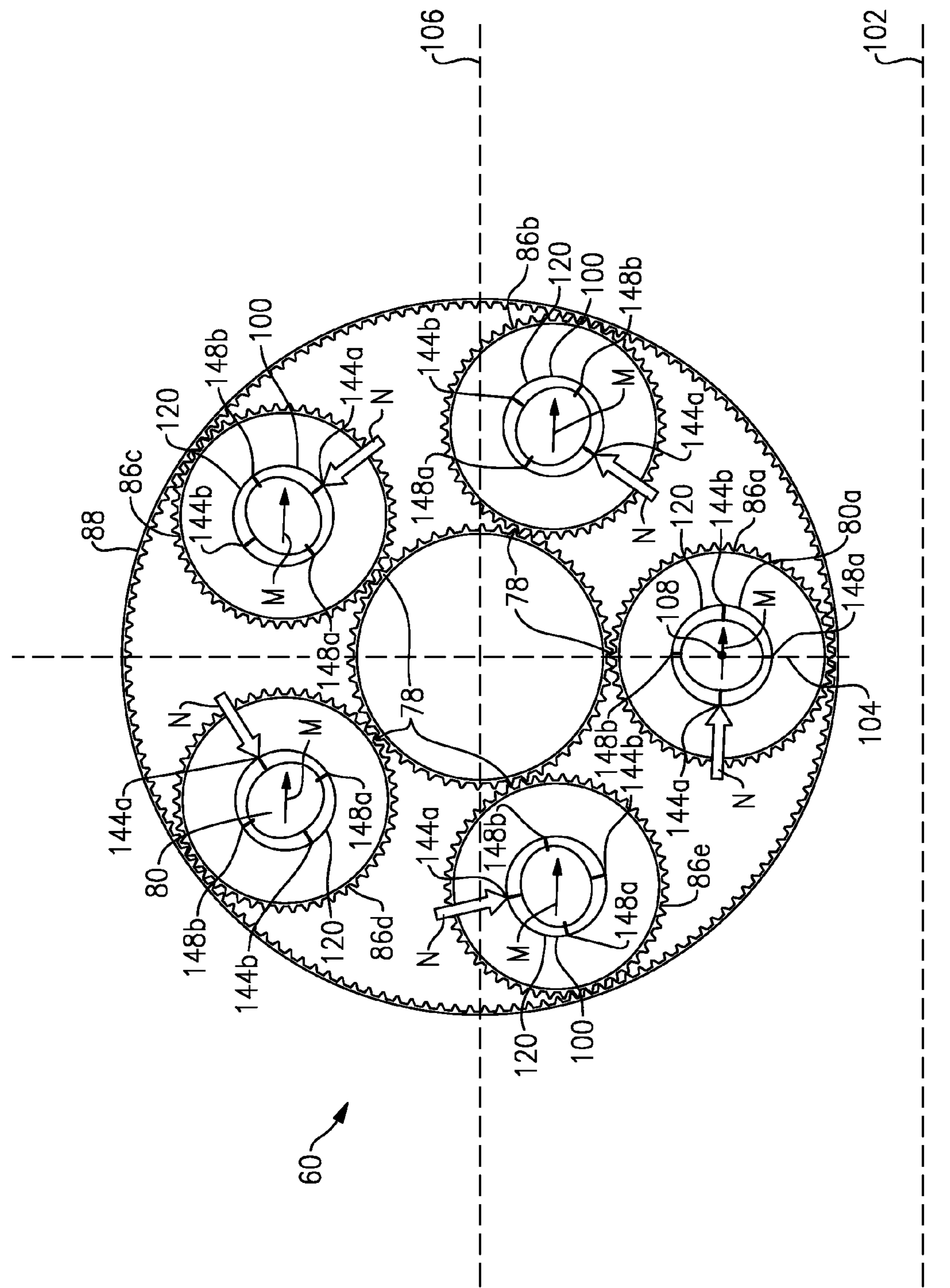
FIG. 5 is a cross sectional view of an example epicyclic gear system including the pin of FIG. 3.

Referring to FIG. 5, with continued reference to FIGS. 2-4, rotating the sun gears 78 causes the star gears 86 to rotate around their respective journal pins 80. The example star gears 86*a-e* remain in the same circumferential position relative to the sun gear 78 while rotating. In this example, there are five star gears 86*a-e* radially oriented about the sun gear 78. However, more or fewer star gears 86 may be used. Also, the star gears 86*a-e* are equally circumferentially spaced about the sun gear 78. However, other orientations may be used.

As the sun gear 78 and ring gear 88 rotate, a force is applied to each star gear 86*a-e*. The force applies a normal load, illustrated by arrows N to each journal pin 80 along the axial length of the journal pin 80. The direction of the normal load N applied to each journal pin 80 is determined based upon the orientation of each journal pin 80 relative to the sun gear 78.

During operation of gas turbine engine 20 (See FIG. 1), gyroscopic loads due to a variety of conditions, including, but not limited to change of direction through fan 42, takeoff conditions, and engine case bending during operation, impart bending moments in fan shaft 131 (see FIG. 2). The flexure of shaft 131 displaces epicyclic gear system 60 through ring gear 88. Due to the displacement, a moment load, illustrated by arrows M, is transferred to the journal pins 80 in system moment plane 106 perpendicular to longitudinal axis P of each journal pin 80 (FIG. 2). The direction of the resultant moment load will vary depending on the gyroscopic load produced during operation.

The normal load N and moment load M on journal pin 80*a* are aligned on the corresponding example star gear 86*a*. The maximum positions 144*a*, 144*b* of the journal pin 80*a* are circumferentially aligned with the normal load N and moment load M. The journal pin 80*a* is provides adequate stiffness to fully support both loads at maximum positions 144*a*, 144*b*.

The remaining journal pins 80*b-e* are circumferentially aligned with their respective normal load N in a different position relative to star gear 88*a*. Although the moment load M can vary in direction, the moment load M is applied in the same direction to each journal pin 80*a-e*. The orientation of the maximum positions 144*a*, 144*b* and minimum positions 148*a*, 148*b* of each journal pin 80*a-e* changes in response to the position of the normal load N.

The variable thickness of the rim 120 of the journal pin 80 allows the rim 120 to be optimized depending on the orientation of the star gear 86*a-e* and corresponding journal pin 80 around the sun gear 78 and the resulting normal load N. This orientation of journal pins 80 distributes the normal load N and moment load M about the rim 120 for moment capability and load capability.

Figure 6:
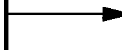
FIG. 6 shows the flow of an example method of installing an epicyclic gear system.

Referring to FIG. 6, a method of installing an epicyclic gear system in a turbomachine 202 includes supporting a first intermediate gear with a journal pin having an asymmetric rim 204. The journal pin is oriented so that a maximum thickness of the rim is circumferentially aligned with a normal load applied to the first intermediate gear 206. The journal pins and corresponding intermediate gears are rotated around the sun gear using a tool (not shown) inserted into the first journal pin. The corresponding intermediate gears are oriented relative to the first intermediate gear (See FIG. 5). about the sun gear. The intermediate gears form at least part of the epicyclic gear system 60 (See FIG. 2) which is attached to low speed spool 30 such that the sun gear 78 rotates with the low speed spool 30.

Various non-limiting embodiments are disclosed herein, however, one of ordinary skill in the art would recognize that various modifications and variations in light of the above teachings will fall within the scope of the claims. For that reason, the following claims should be studied to determine their true scope and content.

What is claimed:

1. A turbomachine epicyclic gear system comprising:

a sun gear rotatable around an axis;

a ring gear radially outward of the sun gear;

a plurality of intermediate gears meshed with the sun gear and the ring gear; and a plurality of journal pins each configured to support one of the plurality of intermediate gears, each of the plurality of journal pins having an asymmetric rim, wherein the rim has a maximum thickness circumferentially aligned with a normal load applied to the journal pins, wherein the normal load is perpendicular to the axis, wherein the rim has a first position with the maximum thickness and a second position with the maximum thickness that is 180° offset from the first position with the maximum thickness, and the rim has a first position with a minimum thickness and second position with the minimum thickness that is 180° offset from the first position with the minimum thickness.

2. The turbomachine epicyclic gear system of claim 1, wherein the first position with the maximum thickness, second position with the maximum thickness, first position with the minimum thickness, and second position with the minimum thickness are evenly circumferentially distributed about the journal pin.

3. The turbomachine epicyclic gear system of claim 1, wherein the asymmetric rim is bounded by a radially outer wall having a constant radius and a radially inner wall having a variable radius.

4. The turbomachine epicyclic gear system of claim 3, wherein the asymmetric rim of each journal pin is oriented about the sun gear based on a direction of a normal load from the meshing of the sun gear and the plurality of intermediate gears.

5. The turbomachine epicyclic gear system of claim 1, wherein the first position with the maximum thickness and the first position with the minimum thickness are offset approximately 90°.

6. The turbomachine epicyclic gear system of claim 2, wherein the epicyclic gear system includes five intermediate gears circumferentially spaced equally about the sun gear.

7. The turbomachine epicyclic gear system of claim 1, wherein the intermediate gear is a star gear.

8. The turbomachine epicyclic gear system of claim 1, wherein the journal pin includes a first axial end and a second axial end, wherein a central portion extends past the first axial end and the second axial end.

9. The turbomachine epicyclic gear system of claim 1, wherein the journal pin is stationary.

10. A turbomachine epicyclic gear system comprising:

a sun gear rotatable around an axis;

a ring gear radially outward of the sun gear;

a plurality of intermediate gears meshed with the sun gear and the ring gear; and a plurality of journal pins each configured to support one of the plurality of intermediate gears, each of the plurality of journal pins having an asymmetric rim, wherein the asymmetric rim is bounded by a radially outer wall having a constant radius and a radially inner wall having a variable radius, wherein the inner wall has a variable radius between 8% and 20% of the radius of the journal pin at a maximum position and between 4% and 10% of the radius of the journal pin at a minimum position.

11. The turbomachine epicyclic gear system of claim 10, wherein the direction of the normal load applied to each journal pin is constant during the rotation of the intermediate gear.

12. The turbomachine epicyclic gear system of claim 10, wherein each journal pin attaches the corresponding intermediate gear to a carrier, the corresponding intermediate gear configured to rotate relative to the journal pin.

13. The turbomachine epicyclic gear system of claim 10, wherein the sun gear is rotatably driven by a low speed spool.

14. A turbomachine comprising: an epicyclic gear system driven by a turbine of a turbomachine, the gear system having a rotatable sun gear, a rotatable ring gear radially outward of the sun gear, and at least one intermediate gear meshed with the sun gear and the ring gear, each intermediate gear supported by a journal pin, wherein each journal pin has an asymmetric rim at an axial end, wherein each rim has a first position with a maximum thickness and a second position with the maximum thickness that is 180° offset from the first position with the maximum thickness, and each rim has a first position with a minimum thickness and second position with the minimum thickness that is 180° offset from the first position with the minimum thickness.

15. The turbomachine of claim 14, wherein each journal pin is oriented about the sun gear based on a direction of a normal load from the rotation of the sun gear and the ring gear.

16. The turbomachine of claim 14, wherein each asymmetric rim is defined between an outer wall having a constant radius and an inner wall having a variable radius.

17. The turbomachine of claim 14, wherein the first position with the maximum thickness, second position with the maximum thickness, first position with the minimum thickness, and second position with the minimum thickness are evenly circumferentially distributed about each respective journal pin.

18. The turbomachine of claim 14, wherein the first position with the maximum thickness and the first position with the minimum thickness of each journal pin are offset approximately 90°.

* * * * *